United States Patent [19]

Glass

[11] Patent Number: 5,056,236
[45] Date of Patent: Oct. 15, 1991

[54] SCULPTING DEVICE

[76] Inventor: Henry Glass, P.O. Box 7553, Roanoke, Va. 24019

[21] Appl. No.: 515,950

[22] Filed: Apr. 27, 1990

[51] Int. Cl.$^5$ .............................................. G01B 5/00
[52] U.S. Cl. ..................................... 33/561.1; 33/562; 434/82
[58] Field of Search ............... 30/494; 264/219, 134; 33/561.1, 562; 434/82

[56] References Cited

FOREIGN PATENT DOCUMENTS 186631  3/1966  U.S.S.R. .............................. 33/561.1

Primary Examiner—Douglas D. Watts
Attorney, Agent, or Firm—Sughrue, Mion, Zinn, Macpeak & Seas

[57] ABSTRACT

A sculpting device is comprised of a hollow cylindrical tube completely filled with a plurality of fibers which extend parallel to each other and the axis of the tube. The fibers are packed within the tube so as to be frictionally held therein while still permitting selective engagement and pushing of the fibers outwardly of the tube at different distances to provide complementary sculpted surfaces at opposite ends of the bundle of fibers. One or more styluses having different configurations may be provided for pushing the fibers from the tube. The internal surface of the tube may be inwardly tapered at opposite ends thereof to enhance the frictional engagement of the fibers within the tube and the tube may be constructed of two parts to facilitate loading the bundle of fibers within the tube.

3 Claims, 2 Drawing Sheets

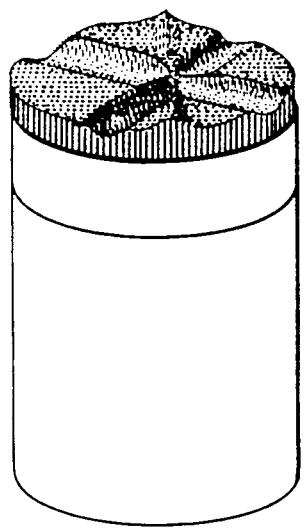
FIG. 2

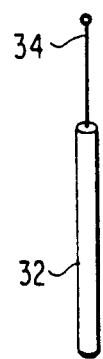
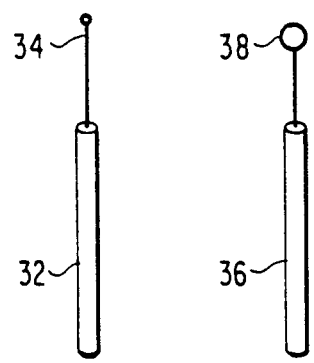
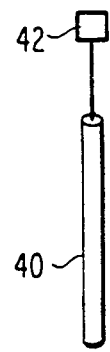
FIG. 4a    FIG. 4b    FIG. 4c

SCULPTING DEVICE

BACKGROUND OF THE INVENTION

The present invention is directed to a sculpting device and more particularly to a hollow cylindrical tube with a plurality of individual fibers frictionally held within the tube for selective displacement therein to provide a three-dimensional contoured projection at one end of the tube.

The use of profile conforming devices is old and well-known in the art as evidenced by the U.S. Pat. Nos. to Burk 2,523,647 and Hopson 2,214,694. In each of these devices, a stack of slats are guided for sliding movement relative to each other between a pair of opposed supporting members so that upon pressing one end of the vertically disposed stack against a person's profile the slats will move relative to each other to provide a corresponding profile at the opposite ends of the stack of slats. The guide members exert a frictional force on the slats to frictionally hold the slats in position relative to each other. An apparatus for molding three-dimensional shapes is also disclosed in the U.S. Pat. No. to Lucy 2,410,888. According to this apparatus a plurality of pins are supported individually in spaced apart vertical parallel relation. The height of each pin may be individually adjusted and a flexible sheet impaled on the ends of the pins to define a three-dimensional surface which may then serve as a mold for a subsequent molding operation.

SUMMARY OF THE INVENTION

The present invention is directed to a new and improved sculpting device which defines a three-dimensional projecting surface formed at one end of a bundle of fibers frictionally held in engagement with each other within a cylindrical holder having a configuration capable of enhancing the frictional retention of the fibers within the tube.

The present invention is directed to a new and improved sculpting device comprising a cylindrical holder open at both ends and having a uniform internal diameter substantially along the entire length of the tube with the internal diameter at each open end of the tube being less than the internal diameter of the tube adjacent the mid-portion thereof. A plurality of individual fibers completely fill the tube in frictional engagement with each other and have a length substantially equal to the length of said tube.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is a perspective view of the sculpting device with selected fibers extending from one end of the cylinder to define a sculptured surface.

FIGS. 4a-4c show styluses having different fiber engaging configurations.

DETAILED DESCRIPTION OF THE INVENTION

Figure 1:
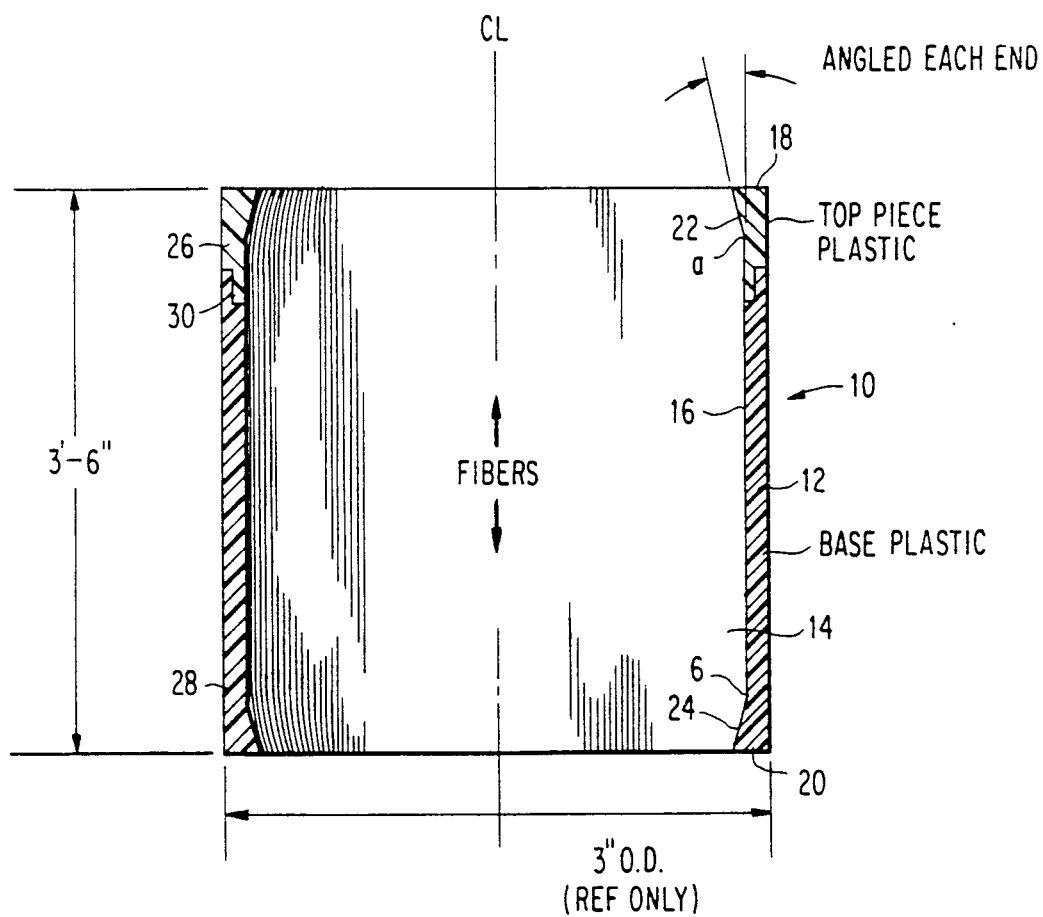
FIG. 1 is a side elevation view in cross-section of the sculpting device with the fibers retracted within the cylinder.

The sculpting device 10 according to the present invention is comprised of a hollow cylindrical tube 12 which is open at both ends and completely filled with a plurality of fibers 14 which are tightly packed within the tube 12 so as to be frictionally held therein. The fibers extend parallel to each other and the longitudinal axis of the cylindrical tube 12. The internal surface 16 of the cylindrical tube 12 has a substantially uniform diameter from point a to point b with the internal diameter gradually decreasing from points a and b toward the ends 18 and 20 of the tube to define truncated conical surfaces 22 and 24 at each end of the tube. The truncated conical surfaces tend to pack the fibers even closer together adjacent the ends to increase the frictional force between the fibers and the internal surface 16 of the tube 12 so that the fibers will not freely slide relative to each other or the tube even if the tube is shaken or inadvertently dropped a short distance.

The tube 12 may be constructed as a one piece plastic tube or may be divided into two parts 26 and 28 which are detachably connected to each other along the line 30. The connection between the parts 26 and 28 may be a frictional connection, a screw thread connection or any other suitable detachable connection. The purpose of dividing the tube 12 into two parts 26 and 28 is to facilitate the placing of the fibers 14 within the tube 12 in view of the inwardly tapering conical surface 22 and 24 at each end of the tube.

Figure 3A:
FIGS. 3a-3c are end views of groups of fibers having different cross-sectional configurations.
Figure 3B:
Figure 3C:

The tube is preferably approximately three inches long but the length of the tube may vary considerably. Individual fibers may also be of plastic material with each fiber having a length identical to the chosen length of the tube 12. The fibers 14 may have a circular cross-sectional configuration as shown in FIG. 3a, a square or rectangular cross-sectional configuration as shown in FIG. 3b or a triangular cross-sectional configuration as shown in FIG. 3c. Any other suitable cross-sectional configuration can be used for the fibers. However, the greatest frictional contact between the individual fibers is achieved with the rectangular or triangular cross-sectional configurations.

Regardless of the particular cross-sectional configuration of the fiber chosen all of the fibers within the tube should have the same cross-sectional configuration. The individual fibers having a circular cross-sectional configuration as shown in FIG. 3a may have a diameter from 0.017 inches depending upon the number of fibers it is desired to have located within the tube which has an internal diameter of approximately three inches. By having a greater number of fibers within the tube greater sculptural detail can be provided.

When the fibers are all disposed within the tube as shown in FIG. 1, the opposite ends of the fibers will present a substantially flat smooth surface. In order to sculpt this surface, it is only necessary to push selected fibers outwardly from one end of the tube by pushing on the fibers from the opposite end of the tube. Selected fibers may be pushed out different distances to achieve the desired sculptured effect. The fibers may be pushed out by any suitable means such as fingers, pencils, pins or any other suitable object. It is also possible to provide a set of pushing elements or styluses which would be sold with the sculpting device in a kit form. The individual styluses would have a different configuration at the end thereof adapted to engage the fibers so that one or more fibers can be pushed outwardly of the tube by pressing the selected stylus against the opposite ends of the fibers. FIG. 4a shows a needle type stylus which would have a cross-sectional diameter equal to or less than the diameter of the fibers within the tube for pushing a single fiber at a time. The stylus shown in FIG. 4b has an enlarged tip which is capable of pushing a plurality of fibers outwardly from the tube simultaneously. The stylus 40 shown in FIG. 4c also has an enlarged stylus with a rectangular cross-sectional configuration which would be suitable for pushing one or more fibers having rectangular cross-sectional configurations such as those illustrated in FIG. 3b. The tips of the styluses may have a three-dimensional configuration such that the stylus would be able to engage a plurality of fibers for pushing the fibers outwardly of the tube while pushing different fibers a different distance.

While specific forms of the tube, fibers and styluses have been illustrated and described, it is obvious that the color. length, cross-sectional configuration and shape of the various components can be readily varied within the scope of the present invention to create unique sculptured effects. Thus, it will be understood by those in the art that the foregoing and other changes in form and details may be made therein without departing from the spirit and scope of the invention.

What is claimed is:

1. A sculpting device comprising a hollow cylindrical tube defining a hollow interior and a plurality of parallel fibers each having a length the same as the tube and completely filling the interior of the tube so as to be frictionally held therein by frictional engagement with each other and the tube, wherein said tube has an interior cylindrical surface having a substantially constant diameter throughout a middle portion of the tube and gradually decreasing internal diameters at either end to define inwardly tapered surfaces to enhance the frictional engagement of the fibers with each other and the tube.

2. A sculpting device as set forth in claim 1 wherein said tube is formed of two parts detachably connected to each other along a circumferentially extending line.

3. A sculpting device comprising a hollow cylindrical tube defining a hollow interior, a plurality of parallel fibers each having a length the same as the tube and completely filling the interior of the tube so as to be frictionally held therein by frictional engagement with each other and the tube, and stylus means for pushing said fibers outwardly at selected distances from an end of the tube to define complementary sculpted surfaces at each end of said plurality of fibers.

* * * * *